Figure 1:
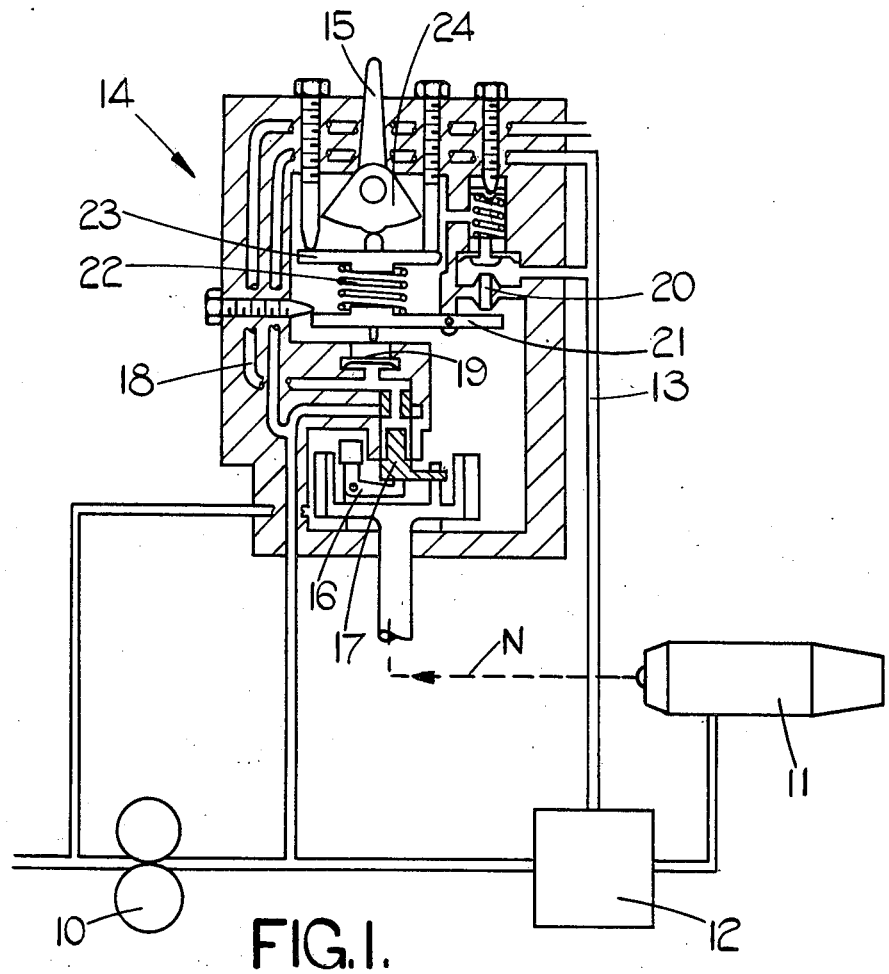

United States Patent [19]
Smith et al.

[11] 4,073,135
[45] Feb. 14, 1978

[54] CONTROL VALVES FOR FLUIDS

[75] Inventors: Trevor Stanley Smith, Sutton Coldfield; Joseph Louis Bloom, Droitwich, both of England

[73] Assignee: Lucas Industries Limited, Birmingham, England

[21] Appl. No.: 725,049

[22] Filed: Sept. 20, 1976

[30] Foreign Application Priority Data

Sept. 26, 1975 United Kingdom ............... 39474/75

[51] Int. Cl.² .............................................. F02C 9/08
[52] U.S. Cl. .................................. 60/39.28 R; 137/82
[58] Field of Search ..................... 60/39.28 R; 137/82; 251/61, 62, 63

[56] References Cited

U.S. PATENT DOCUMENTS

| 3,438,199 | 4/1969 | McGinnis | 60/39.28 R |
| 3,777,478 | 12/1973 | Moore | 60/39.28 R |

Primary Examiner—Clarence R. Gordon

[57] ABSTRACT

A fluid flow control valve, particularly for use in a gas turbine engine fuel control system has an orifice with a closure member which is urged open by a pressure signal and which is urged shut by a biasing spring. The bias applied by the spring is variable by an input control lever and the response of the spring bias variation to lever movement is itself adjustable.

8 Claims, 3 Drawing Figures

CONTROL VALVES FOR FLUIDS

This invention relates to control valves for fluids.

It is a known requirement, for example in a gas turbine engine fuel control system, to provide a servo pressure signal which is a function both of an engine-speed responsive pressure signal and of the position of an engine power demand control. Such a fuel control system is described in our published co-pending German Patent Application 2,542,549.

According to the invention a fluid flow control valve includes an orifice, a control element for said orifice, means, responsive to an input pressure signal, for moving said control element relative to said orifice, biasing means for urging said control element against the force applied by said input pressure signal, and means responsive to operation of an engine power demand control for varying the force applied by said biasing means to said control element.

In a preferred embodiment of the invention said means for varying the force applied by said biasing means comprises a cam, a cam follower coacting with said cam and with said biasing means, said cam and said cam follower being relatively movable by said engine power demand control, said cam follower including a movable element and first and second rollers mounted on said element, said first roller engaging a surface on said cam, and a resiliently deformable member which is fixed relative to said cam and which engages said second roller in all relative operating positions of said cam and said cam follower, said deformable member acting through said second roller to urge said first roller into contact with said cam surface.

According to a further preferred embodiment said control element is mounted for probable movement with respect to said orifice, said biasing means coacts with said control element to apply a torque thereto, and said means for varying the force applied by said biasing means comprises means for varying the line of action of said biasing means with respect to the pivotal axis of said control element.

Figure 3:
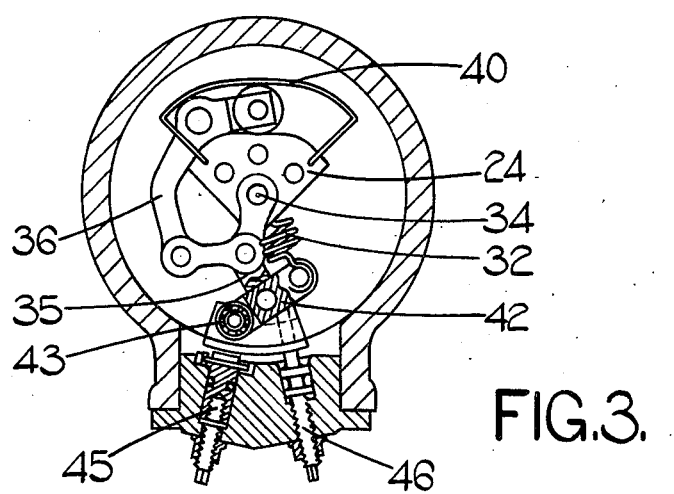
Figure 2:
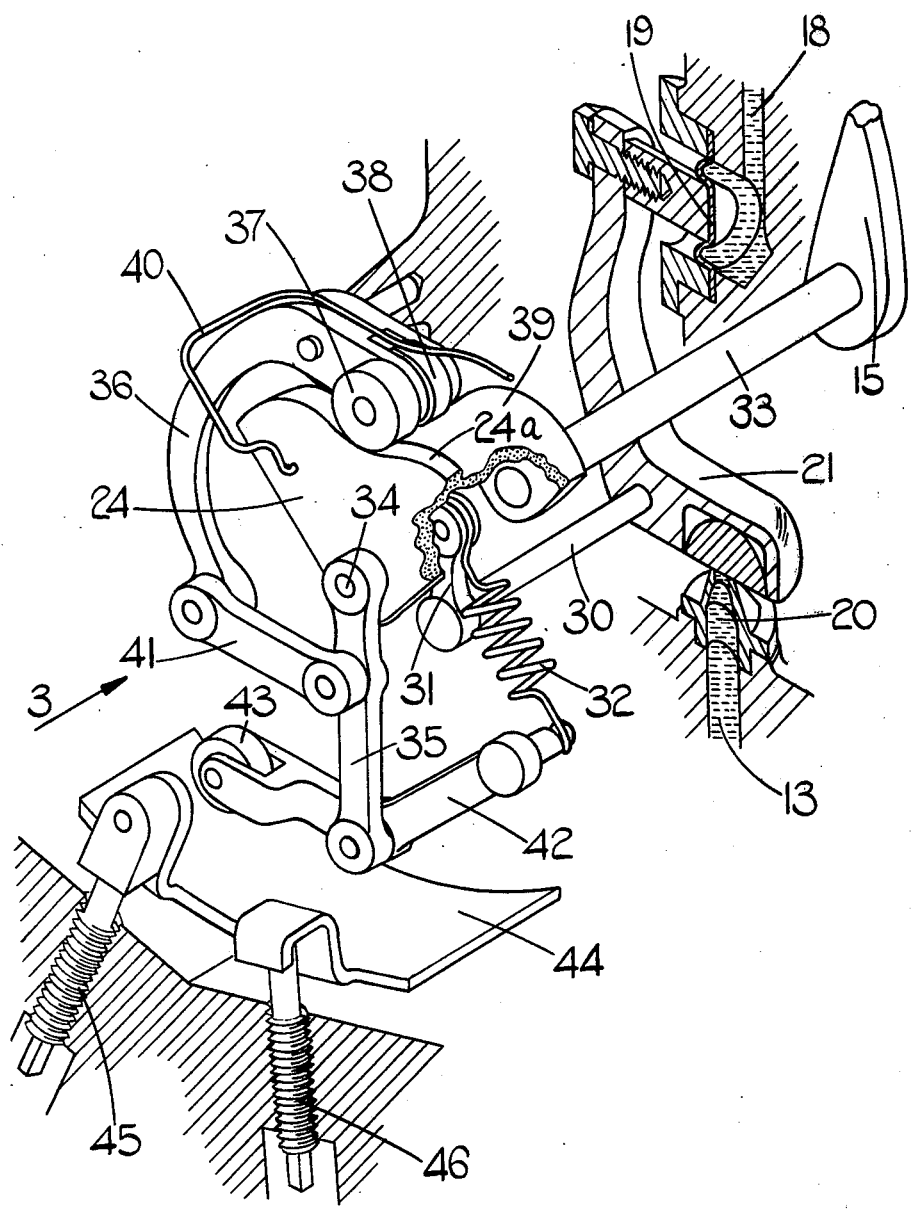

An example of the invention will now be described with reference to the accompanying drawings in which:

FIG. 1 shows, diagrammatically, a gas turbine engine fuel control system, incorporating a valve according to the invention, FIG. 2 shows, pictorially, the inter-relationship of the valve parts, and FIG. 3 shows a mechanical arrangement of the valve parts, viewed on arrow 3 in FIG. 2.

As shown in FIG. 1 a pump 10 supplies fuel to an engine 11 via a metering device 12. Metering device is responsive to variations in a servo pressure signal in a line 13. The pressure in line 13 is derived from the output of pump 10 by a valve arrangement 14 which is responsive to engine speed N and an engine power demand control 15.

Valve arrangement 14 includes a governor device 16 driven by the engine 11 to move a spool control element 17 so as to provide, in a passage 18, a pressure signal which is intermediate the pressures upstream and downstream of the pump 10 and which is dependent on engine speed N.

The pressure signal in passage 18 acts on a diaphragm 19.

Also connected between the upstream and downstream sides of the pump 10 is an orifice 20. A lever control element 21 for the orifice 20 is pivotally mounted in the body of the valve arrangement 14 and engages the diaphragm 19. An increase in the pressure signal in passage 18 urges the lever control element 21 in a direction to increase flow through the orifice 20. Element 21 is biased against this movement by a spring 22, and the bias applied by spring 22 is variable by means of a plate 23 engaged by a cam 24. The cam 24 is movable by the engine power demand control 15. The cam 24 is movable in respective opposite directions from a central position (shown) which corresponds to a minimum engine power demand. Movement of the cam 24 in either direction from this position reduces the bias applied by spring 22, increasing the flow through orifice 20, reducing the servo pressure signal in line 13 to increase fuel flow to the engine. An increase in engine speed N increases the pressure signal in passage 18, urging control element 21 towards orifice 20, thereby reducing fuel flow to the engine 11.

In the pictorial view of valve arrangement 14, shown in FIG. 2, corresponding parts have been given the same numbers as in FIG. 1.

As shown in FIG. 2 the lever control element 21 is cranked and secured to a pivot pin 30 which is supported in the valve arrangement body. A lever arm 31 is also secured to the pivot pin 30, and the free end of arm 31 is secured to one end of an extension spring 32.

Cam 24 is mounted on a spindle 33 for rotation by the power demand control 15. A pivot pin 34, coaxial with the spindle 33 carries one end of a link 35.

Pivotally mounted on the valve body is a cam follower comprising a lever 36 at one end of which is a pair of independently rotatable, axially aligned rollers 37, 38. Roller 37 engages a profiled surface 24a of the cam 24. Cam 24 has an axially extending portion 39 which is recessed from the surface 24a so as not to be engageable by the roller 38. A spring steel wire 40 has its opposite ends secured to the cam 24 and has a central portion which extends substantially parallel to the profiled surface 24a and is engageable by the roller 38. The wire 40 provides a bias which urges the roller 37 into engagement with the surface 24a. The rollers 37, 38 being freely rotatable in opposite directions reaction between the cam follower and the cam 24 is limited to the rotational friction of the roller 37.

The end of lever 36 remote from rollers 37, 38 pivotally supports one end of a link 41 whose other end pivotally engages the link 35 intermediate the ends thereof. Pivotal movement of lever 36 as a result of movement of the cam 24 thus causes link 35 to move pivotally about the pin 34.

The end of link 35 remote from pin 34 pivotally engages the centre portion of a lever 42. One end of lever 42 is secured to the end of extension spring 32 remote from the arm 31, and the other end of lever 42 carries a roller 43 which engages a generally arcuate track 44. Pivotal movement of link 35 thus alters the line of action of the spring 32 with respect to the axis of the pivot pin 30, and thereby alters the moment of the force applied by spring 32 to the lever control element 21.

The position of the track 44 may be adjusted by means of screws 45, 46, whereby variations in the force applied by spring 32, as its line of action alters, may readily be adjusted.

The track 44 is mounted so as, in effect, to be pivotal about points which lie on the extended axes of screws 45, 46, whereby the track 44 may be pivoted by either one of the screws 45, 46 about the end of the other one of these screws. The arrangement is such that the roller 43 lies adjacent the end of screw 45 when the control 15 is in a position corresponding to minimum engine power demand, whereby screw 45 may be adjusted to provide a bias of spring 32, opposing the pressure in passage 18, to set a minimum engine speed for this condition. Roller 43 is adjacent the end of screw 46 when control 15 is in a maximum engine power demand condition, and screw 46 may therefore be adjusted to provide a maximum engine speed for this condition.

We claim:

1. A fluid flow control valve, including an orifice, a control element for said orifice, means, responsive to an input pressure signal, for moving said control element relatively to said orifice, biasing means for urging said control element against the force applied by said input pressure signal, and means responsive to operation of an engine power demand control for varying the force applied by said biasing means to said control element, said force varying means comprising a cam, a cam follower coacting with said cam and with said biasing means, said cam and said cam follower being relatively movable by said engine power demand control, said cam follower including a movable element and first and second rollers mounted on said element, said first roller engaging a surface on said cam, and a resiliently deformable member which is fixed relative to said cam and which engages said second roller in all relative operating positions of said cam and said cam follower, said deformable member acting through said second roller to urge said first roller into contact with said cam surface.

2. A valve as claimed in claim 1 which includes means for adjusting the force which is exerted by said biasing means at each of a plurality of positions of said engine power demand control.

3. A valve as claimed in claim 2 in which said biasing means comprises a spring and said force adjusting means comprises a surface, a part coupled to an end of the spring and engaging said surface, and means, responsive to movement of said power demand control for causing relative movement between said surface and said part.

4. A valve as claimed in claim 3 in which said part is operatively connected to said power demand control for movement thereby.

5. A valve as claimed in claim 4 which includes means for altering the orientation of said surface relative to a housing of said valve.

6. A valve as claimed in claim 5 in which said means for altering the orientation of said surface includes screws coacting with said surface at opposite ends of the track of said part thereover, said screws being operable to cause translational movement of one area of said surface with respect to another area thereof.

7. A valve as claimed in claim 3 in which siad cam is movable by said engine power demand control and said part is coupled to said cam follower for movement therewith.

8. A valve as claimed in claim 2 in which said control element includes a lever arm and in which said biasing means comprises a coil spring having one end secured to said lever arm, and in which said force-adjusting means comprises means for moving the other end of said spring so as to vary the line of action of the force applied thereby with respect to the pivotal axis of said control element.

* * * * *